US006266593B1

(12) United States Patent
Seip et al.

(10) Patent No.: US 6,266,593 B1
(45) Date of Patent: Jul. 24, 2001

(54) AUTOMOTIVE OCCUPANCY SENSOR GRAY ZONE NEURAL NET CONDITIONING PROCESS FOR AIRBAG DEPLOYMENT SYSTEMS

(75) Inventors: Ralf Seip, Indianapolis, IN (US); Steven W. Decker, Clarkston, MI (US)

(73) Assignee: Robert Bosch Corporation, Farmington Hills, MI (US)

( * ) Notice: Subject to any disclaimer, the term of this patent is extended or adjusted under 35 U.S.C. 154(b) by 0 days.

(21) Appl. No.: 09/477,268

(22) Filed: Jan. 4, 2000

Related U.S. Application Data

(63) Continuation-in-part of application No. 08/957,730, filed on Oct. 24, 1997.

(60) Provisional application No. 60/028,844, filed on Oct. 23, 1996.

(51) Int. Cl.$^7$ .................................................... B60R 21/32

(52) U.S. Cl. .................. 701/45; 701/46; 706/25

(58) Field of Search .................. 701/45, 46, 47; 706/25, 20, 16, 23, 905; 280/735

(56) References Cited

U.S. PATENT DOCUMENTS 5,377,108 * 12/1994 Nishio .................................... 701/45

* cited by examiner

Primary Examiner—Tan Nguyen
(74) Attorney, Agent, or Firm—Innovation Law Group, Ltd; Jacques M. Dulin, Esq.

(57) ABSTRACT

An automotive occupancy sensing system and method for use in conjunction with airbag deployment systems, by which occupant nature, location and motion parameters within the vehicle interior are determined by ultrasound (US) and/or infrared sensors. (IS). Criteria for airbag disablement or airbag modified/partial deployment are used to determine whether appropriate disablement or modified/partial deployment control signals are transmitted to the vehicle airbag deployment system. More particularly the system establishes a Keep Out Zone (KOZ) within the vehicle interior relative to the dashboard or instrument panel and determines actual or imminent incursions by occupants into the KOZ to produce a Keep Out Zone Incursion (KOZI) signal. The system is also characterized by establishing a "Gray Area" bounding the KOZ. Sensor signals from objects/persons in the Gray Zone area selectively used or discarded as part of the training process for a neural net AOS process, and thereby detection performance is substantially enhanced.

11 Claims, 3 Drawing Sheets

AUTOMOTIVE OCCUPANCY SENSOR GRAY ZONE NEURAL NET CONDITIONING PROCESS FOR AIRBAG DEPLOYMENT SYSTEMS

DESCRIPTION

CROSS REFERENCE TO RELATED APPLICATIONS

This application is a Continuation-in-part of application Ser. No. 08/957,730, filed Oct. 23, 1997, entitled "Keep Out Zone Incursion Fast Sensing Mode For Airbag Deployment Systems", pending, which in turn is based on Provisional Application No. 60/028,844 filed Oct. 23, 1996, also entitled "Keep Out Zone Incursion Fast Sensing Mode For Airbag Deployment Systems". Each of the above referenced applications is incorporated by reference and the benefit of the filing date of each is hereby claimed under 35 U.S.C. §§ 1.19 and 1.20.

TECHNICAL FIELD

The invention relates to automotive occupancy sensing (AOS) systems and methods for sensing and determining the occupancy state, including the nature, type or location of occupant (if any) with respect to the vehicle interior, and more particularly with respect to the occupant seat and dashboard or instrument panel (IP), to develop a signal useable by the airbag deployment system (ADS) by which the ADS can deploy or not (abort deployment), or modify deployment for multiphase airbags, or for partial or controlled rate inflation airbags, collectively herein termed Smart Airbag Systems. The system is characterized by defining in the vehicle interior an Occupancy Zone (OZ), a Keep-Out Zone (KOZ) and a "Gray Zone" (GZ) intermediate to the OZ and KOZ. Sensor signals from objects/persons in the Gray Zone area selectively used or discarded as part of the conditioning and training process for a neural net AOS process, and thereby detection performance is substantially enhanced.

BACKGROUND OF THE INVENTION

For background on AOS systems see Corrado et al., U.S. Pat. No. 5,482,314. Such systems produce a signal for input to the ADS, which if the occupant is out of position (OOP) or in a rear facing infant seat (RFIS) (in the front seat of a vehicle), the deployment of the airbag is aborted, deferred or otherwise controlled, as in SAS.

More recent studies have revealed that there is a class of slow speed automotive accidents causing injury to children, youngsters and frail adults. This usually occurs when the ΔV of the "crash" is 18 miles per hour or less, where the occupant or RFIS is unbelted and the driver jams on the brake. The airbag deployment sensor experiences a G-force great enough to signal deployment. During these low speed accidents, the child or occupant typically has slid, or is sliding, forward into the IP and KOZ when the airbag deploys. The airbag deployment injures the child because it is too close, having intruded into the Keep Out Zone (KOZ).

Neural net algorithms have a wide range of successful useful applications in various technical fields, such as voice recognition, diagnostic systems and machine vision, and are generally well known in the art. Neural networks are sometimes used in system classification tasks for which not all the rules, system descriptions, or underlying equations are known. For such systems, the neural network is presented with a limited number of samples or "snapshots" (neural network inputs), and the known system outputs for those snapshots (neural network outputs). This input and output data is collectively known as the neural network "training set", and is used to train (or program, or "adapt") the neural network to the particular problem or system it is supposed to solve or identify. If the training set, the neural network architecture, and the training rules and parameters are chosen properly, a system capable of correctly identifying patterns of data typically not originally present in the training set can be built. Here lies the power of neural-network-based systems: they are able to generalize and infer correct results from a limited (original) training dataset.

The process of developing an adaptive type of neural net algorithm is typically a 3 step process: Step 1 is to generate a data set that contains the test cases the system is required to learn. Step 2 is to train the neural network to recognize the data and separate it into the required decision space. Step 3 is to is to evaluate the performance against data not included in the training data set used in step 1.

SUMMARY OF THE INVENTION

The invention is preferably employed in association with a hierarchical discrimination system as a gateway to the probability analysis disclosed in our prior U.S. Pat. No. 5,482,314, and is preferably used in association with ultrasound sensing, or other sensor type, to determine the intrusion into a defined Keep Out Zone (KOZ) between the instrument panel and the occupant seat. The invention comprises establishing a Gray Zone (herein GZ) formed by a zone intermediate the KOZ and the occupancy zone (herein OZ) which is the proper seating area of a passenger, and discarding selected data from incursions, or data from selected types or scenarios of incursions, into the GZ during neural net training (and optionally during operation). Unexpectedly, by excluding signals from the GZ, particularly and preferably when training the neural net, the performance in working practice is improved by around 5% or better, which is significant as this refers to statistical probability percentages of recognition, of the type disclosed in our prior U.S. Pat. No. 5,482,314.

AOS systems, such as that disclosed in U.S. Pat. No. 5,482,314, may make use of neural net algorithms as an element of the signal processing and occupancy state determination methodology. The disclosure of that patent is hereby incorporated by reference to the extent needed, e.g., particularly for discussion of fusion algorithms, state determinations, probabilities, and the like. The GZ can be defined by an overlap in the OZ (also known as the Non-KOZ) and the KOZ, or by separating the OZ from the KOZ.

Neural networks may be advantageously used as elements of AOS systems. The training characteristics described above are useful, since it is not generally desirable to train or configure the AOS system based on a very large number of seat occupancy scenarios. Instead, a limited set of training vectors (consisting typically of 30,000 individual seat occupancy scenarios) is used to train an AOS neural network system. The AOS neural network then uses this information to correctly classify and identify seat occupancy cases it has not seen before (unknown cases).

The generalization capability of a neural network, however, is also limited. In this lies one of the disadvantages of using neural networks as system classification tools: even though they perform well against a much larger set of test cases (unknowns in later operation) than the original training data set (from the training vector scenarios), they do not perform well for ALL test cases. This point is of particular importance to safety-critical AOS systems, since such systems must perform well during all possible occupancy scenarios. Preferably alternate hardware means of detection of these cases are employed. Such means typically include additional information input sources, such as motion detectors, or an additional occupancy sensor input.

A second disadvantage of neural networks is that once a system is "trained," it performs well, but is typically difficult to analyze. It behaves as a "black box" (albeit a black box that does what it is trained to do), giving the user little insight on how this system arrives at its results. This is related to the architecture of neural networks, typically consisting of many interconnected neurons or processing elements, with each connection characterized by a specific weight, which by itself, does not mean much. It is only the combination of these weights and interconnections that give neural networks their power as classification and system identification tools.

The key to the use of neural networks in any classification task in general, and in AOS classification systems in particular, lies in "conditioning" the neural network, by which is meant more than applying well known Training Rules, but also selection of the training set and removal of signal ambiguities in one or more zones, and/or in an intermediate GZ. Thus, the method of the invention comprises improvements in the neural net "training" protocol which involves steps of conditioning the neural net with less that all of the sensor data. More specifically the invention involves improvements in the selection of the training set and the added step of removal of ambiguous GZ signals during training. The preferred method of the invention for training neural networks for AOS classification systems comprises the following conditioning steps for a selected neural network Architecture and set of Training Rules:

1. Select a representative known scenario training set, e.g., known seat empty and seat occupancy scenarios which include KOZ, non-KOZ and GZ case scenarios. This necessarily involves defining a GZ intermediate the KOZ and non-KOZ.

2. Remove (through signal pre-processing) irrelevant or confusing information that is not part of the actual classification task, such as: data motion artifacts, temperature effects on the data, sensor calibration issues, and the like.

3. Selectively removing, based on overlap criteria (e.g., size, configuration and location of zones), of signals from the GZ that could be interpreted as classification ambiguous, as described in more detail herein.

4. Extract and use from the training set sensor output data only those features that carry actual classification information and discard the rest.

5. Train the neural network using known scenarios.

6. Test the neural network performance against an independent test set (a non-training test set which comprises a different set of known scenarios) to determine the accuracy of the classification decisions of the known, non-training test set scenarios; and 7. Repeat above conditioning and training steps until a selected classification accuracy level or rate has been achieved.

A number of neural network Architectures and Training Rules are available, and ordinarily either accompany the particular neural net, are recommended for the selected neural net, or can be obtained in the literature. The term "Architecture" refers to the number of processing elements and the geometry of the interconnections (see, e.g., FIG. 3, hereof). The Architecture should be at least 4 layered: 1 input, 2 hidden and 1 output layer, the at least 2 hidden layers being preferred because of the complexity of the classification required in an AOS system. The term "Training Rules" is also a term of art, well known to those skilled in this art as being independent of what the network is trying to learn. Such Training Rules typically include supervised learning (such as back propagation) and unsupervised learning (such as clustering). Each individual neuron (or Processing Element, "PE") in the netwok is also controlled by various parameters, such as, learning rate, temperature, activation threshold and the like. Various known training techniques can be used, such as reinforcement.

The definition and use of a Grey Zone in AOS detected signal processing markedly enhances system performance. Typically, the KOZ zone is 6" to 12" deep (measured off of the face of the instrument panel) and located in front or over the airbag door. "Intrusion" includes both actual presence in the zone or such approach to the zone that entry is predictably imminent. In AOS operation using the Grey Zone as defined in the invention, return sensor input signals from the OZ and KOZ are processed differently than sensor signals from the Grey Zone.

An occupant sensor trained with a non-Grey zone type of approach will typically suffer from several problems. The first problem would appear during training. As the occupant transitions from one zone to another (e.g., from OZ to KOZ), the resulting change in the data from the sensors is very slight. The algorithm must attempt to differentiate between an occupant in one such zone as one class, then with only a slight movement, it must recognize an occupant in the other zone as a different class. Since there is not much change in the data, the performance along the zone edge (e.g., boundary between OZ and KOZ) will be poor. When trained, the algorithm would exhibit very erratic, and unpredictable behavior when the occupant is near the edge of the zone.

In contrast, the neural net training methodology of the invention includes determining a training set which selectively excludes data from a Grey-Zone, and which provides for more effective neural net training.

DETAILED DESCRIPTION OF THE BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
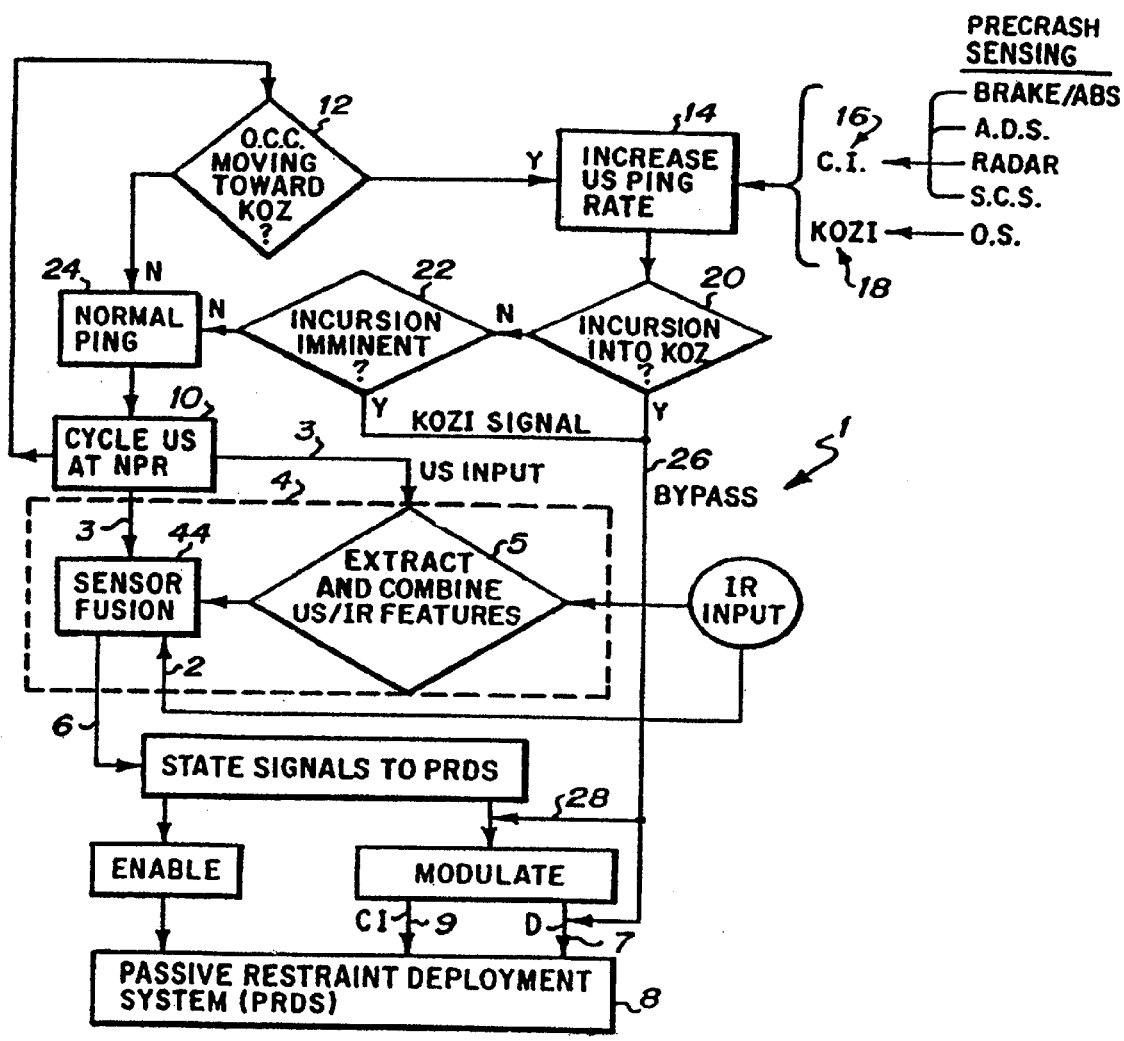
FIG. 1 is a schematic block diagram of the process of the invention.

FIG. 1 illustrates an exemplary AOS process using the Grey Zone of the invention 1. In the normal occupant sensing operation, the headliner direct infrared (IR) and ultrasound (US) sensors provide direct IR input 2 and US input 3 to the processor 4, including its neural net, which also combines IR and US inputs 5. The processor 4, by sensor fusion 44 (by algorithms such as described in aforesaid U.S. Pat. No. 5,482,314) evaluates signals, extracts signal features, and combines selected signal features to obtain fused features. The processor 4 utilizes occupancy history information to associate the signal features and fused features, with a predetermined, vehicle-specific set of confidence values and empirical relationships related to known occupancy scenarios, to determine a feature state value, and generates a state signal 6 depending on the occupancy state.

The fusion algorithm incorporates a "sensor blocked" determination that can trigger a dash warning light or sound an alarm when sensors are blocked by an object, say a balloon, hat, hand, or some other physical object such as a plant placed on the seat or floor and extending up to the headliner. In this case, the PRDS (airbag deployment system) makes a determination of what response to carry out. Preferably, there are three options: (1) always enable; (2) always disable; and (3) hold previous state until the blocked condition is removed.

The signal can include generating an airbag deactivate signal 7 if the current state value is one of a subset of state values for which the passive restraint deployment system 8 is to be deactivated 7 or controlled 9, e.g., in a Smart Airbag System (SAS).

Change of the AOS ultrasonic sensors to fast ping mode is the subject of application Ser. No. 08/957,730, and may be used alone or in conduction with the GZ invention of this application.

This invention is realized in practice in the fusion algorithm 44 and the US/IR feature combination process 5, which executes the neural net, located in the processor 4 which carries out the occupancy classification task. At the time of AOS process execution, the neural network will have already been conditioned and trained with the methods described above, that is, with a training set that has been altered through the exclusion of selected specific Gray Zone occupancy cases or selected data thereof to enhance the performance of the overall system.

Figure 3:
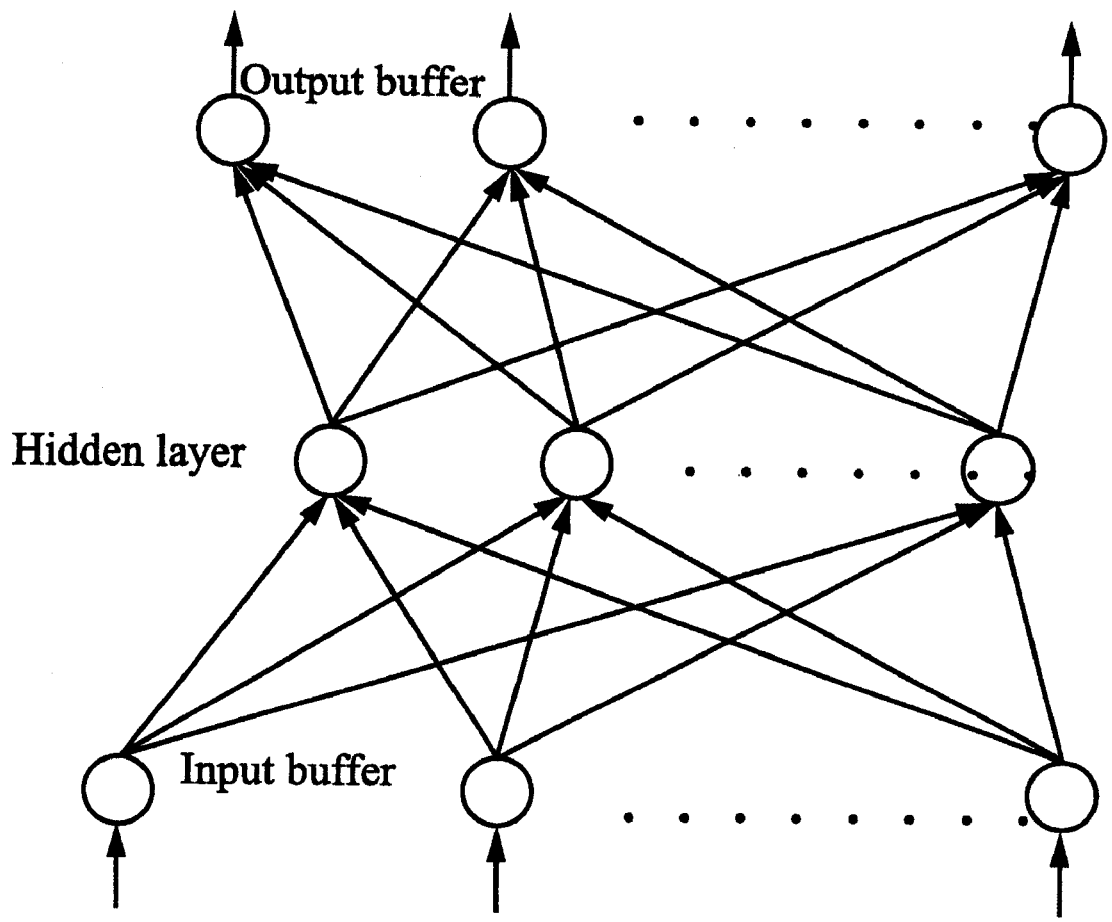
FIG. 3 is a schematic diagram of a neural network used in a processor of the invention, showing the processing elements (PE's) as nodes in the net, interconnected by multiple connections.

FIG. 3 is a schematic diagram of a typical neural network Architecture suitable for use in the invention, showing the processing elements (PE's) as nodes in the net, interconnected by multiple connections, each carrying its own weight. As noted above, neural net algorithms are well known in the art. AOS systems, such as that disclosed in U.S. Pat. No. 5,482,314, may make use of neural nets in the fusion algorithms as an element of the signal processing and occupancy state determination methodology.

The classification of occupancy state function is preferably a neural net (NN) discrete function with fusion table, and essentially classifies the occupancy of a passenger seat in the volume unambiguously determined to be in the OZ (or "not KOZ"). The algorithm typically outputs the states of:

Occupant-adult like;

Occupant-other than adult like;

RFIS (Rear Facing Infant Seat); or

Empty

It should be understood that there can be some tolerance in the dimensions selected for an algorithm to determine an output occupancy state.

In its basic form, the boundary between the KOZ and the non-KOZ is defined geometrically as a surface (not necessarily a solid, physical surface). The shape and position of this boundary surface is determined by the specific interior of the vehicle, as well as by customer-specific safety requirements. One of the tasks of an AOS system (as shown in FIG. 1) is to determine when an object such as a head, arm, or upper body has intersected and crossed this surface, and intruded into the KOZ (KOZ incursion or KOZI, see FIG. 2). Sensors used to detect a KOZ intrusion will be very accurate if their sensing direction is such that it is perpendicular to the KOZ/non-KOZ surface, and their sensing method is "point-like". Thus, to properly define the KOZ/non-KOZ surface, a multitude of sensors located perpendicular to this surface would be needed (mounted in the dashboard and windshield, for example). Such an arrangement is typically not desirable for practical considerations including cost, safety to occupants, and availability (they are easily blocked) In contrast, more remotely located sensors that are mounted such that their sensing direction is not perpendicular to the KOZ/non-KOZ boundary surface will be less accurate in detecting a KOZ intrusion, giving rise to potential sensing ambiguities and in general reducing the KOZ intrusion detection performance.

A different methodology is thus utilized by this invention to at least partially compensate for the sensing deficiencies. One such method is the one described here, in which boundary cases that generate sensing ambiguities for the KOZ/non-KOZ problem are removed from the training set of the KOZ neural network classifier. These boundary cases lie within the pre-determined Gray Zone of the invention (Grey Zone cases).

The KOZ is a volume defined by a sensor which can detect the presence of an object within the defined volume. It has a preset effective field of view defined by the effective sensor beam positioning. It operates as part of the overall algorithm and is based on the cycle rate of the system. Its output is a "disable" the airbag signal.

Figure 2:
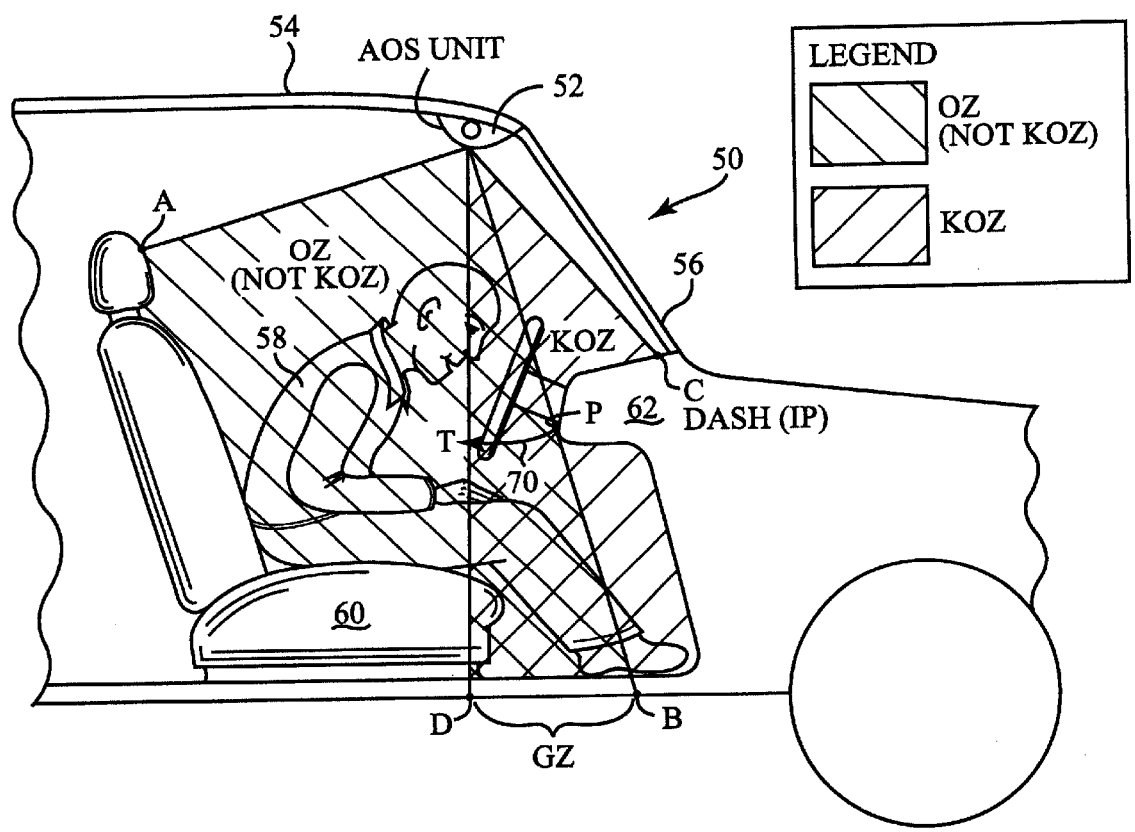
FIG. 2 is a schematic side elevation view of a Gray Zone established between the OZ and the KOZ or as an overlap thereof.

Referring now to FIG. 2, the Gray Zone, which can also be called a classification ambiguity zone, is the volume defined by or between the unambiguous KOZ and the OZ (or "not KOZ"). It is the volume determined as sufficient to separate the data defining both those zones. It is used as a NN training construct to increase the classification accuracy in the KOZ and OZ regions as described above. Thus, FIG. 2 shows vehicle 50, having an automotive occupancy unit (AOS) 52, comprising a plurality of sensors such as IR and US sensors shown and described in our prior U.S. Pat. No. 5,482,314, mounted in the headliner 54 adjacent the windshield 56 including one dedicated to the KOZ. The AOS sensors are aimed to provide US beams subtending defined space zones, and includes a KOZ shown schematically as a zone defined by angle COD, and an Occupancy Zone (OZ or not KOZ) defined by angle AOB. Note the Gray Zone (GZ) is defined either as the cross-hatched area defined by the overlap of the KOZ and the OZ, or between those two zones, and is identified by angle DOB. The return US signals from the GZ may be selectively either be used or not used (discarded), or selected features thereof used or discarded, during exemplar (empirical known senario) training of the neural net. This increases the accuracy of the neural net on the order of 5% when an unknown object is sensed during operation without discarding data in the GZ.

As shown in FIG. 2, occupant 58 in passenger seat 60 is leaning or has been propelled forward toward the IP 62 and the head of the passenger is now in the GZ. During neural net training, signals from a portion (or all) of the OZ defined by points AOD are processed. Likewise the signals from unambiguous KOZ, defined by points BOC are processed, while signals from the region or Grey zone defined by points DOB are ignored (selectively or entirely discarded or not processed) in the decision algorithm. Then later, during normal operation, incursion of a passenger's head into the DOB zone is read properly with significantly higher decision confidence level resulting in more accurate operation. Line 70 represents a US sensor vertical range limitation for the GZ, so the GZ is effectively defined as area TOP. the location of the bottom of the GZ may vary and is determined by selection of the length of the return US signal that is processed.

The selective removal of GZ training vectors has as a consequence that the KOZ/non-KOZ boundary is transformed from a surface (original boundary definition) to a thin, sheet-like volume, implying a tolerance that is typically as wide as the GZ itself.

Thus, a tolerance separation between KOZ and OZ (Grey Zone) is preferred over a "idealized" boundary (geometric surface) because the Grey Zone (volume) boundary provides for increased classification accuracy as compared to the surface boundary. Typically, the tolerance of this zone is approximately 5 cm wide with an ultrasound-based, center-console mounted AOS system., buth the width may vary from application to application as can be determined by simple trials.

In operation, the received signals (US and IR) are processed to determine the passenger seat occupancy state by evaluating US signal features, e.g. as described in our aforesaid patent via a fusion table or logically derived processing, such as comparison to stored known incursion and no-incursion events. The IR signal features are continuously processed to determine if an adult-like occupant is in the seat, and the fusion table weighted accordingly.

While the Gray Zone is shown in FIG. 2 as a vertical oriented (up and down) zone, it should be understood that it can be a laterally configured zone. The configuration of the GZ can be adjusted by the aiming of the plural US and/or IR sensors, there being plural sensors in the AOS module in the headliner, or wherever the AOS is conveniently located (e.g., in a pillar, above doors, on dash, or the like). Plural, distributed sensors may be employed.

INDUSTRIAL APPLICABILITY

It is evident that the Gray Zone, especially in training a neural net, has wide applicability to detection of occupancy in a variety of commercially significant vehicles, in order to assist in deploying or not the airbag under various scenarios. Thus the methods and systems of the invention for example, can generate a signal that results in the airbag control system not deploying the airbag where it could injure a passenger positioned too close to the instrument panel. The result is saved lives and reduced costs in not having to replace unnecessarily triggered airbags. The systems and methods of the invention can be applied to either IR or US sensors, or both.

It should be understood that various modifications within the scope of this invention can be made by one of ordinary skill in the art without departing from the spirit thereof. We therefore wish this invention to be defined by the scope of the appended claims as broadly as the prior art will permit, and in view of the specification if need be.

What is claimed is:

1. A method of neural net conditioning in an airbag occupancy sensor system for a vehicle interior, said system having a plurality of sensors and at least one sensor signal processing algorithm including a neural net, comprising in any operative sequence the steps of:
   a) establishing a keep out zone;
   b) establishing an occupant zone;
   c) defining between said keep out and occupancy zones an intermediate gray zone;
   d) determining which signals from said sensors are from objects in said gray zone;
   e) selecting at least a portion of said signals from objects in said gray zone; and
   f) discarding said selected signals when training said neural net to recognize during normal operation at least one of occupant nature, location, or combinations thereof.

2. The method of claim 1, wherein said at least one sensor signal processing algorithm includes at least one sensor fusion algorithm.

3. The method of claim 2, wherein said step of discarding said selected signals includes not using selected features of said selected signals during said training, and using non-selected features of said selected signals during said training.

4. The method of claim 2, wherein said step of selecting at least a portion of said gray zone signals includes selecting substantially all of said signals.

5. Method as in claim 2 wherein a fusion algorithm executes the neural network.

6. A method of neural net conditioning in an airbag occupancy sensor system for a vehicle interior, said system having a plurality of sensors and at least one sensor signal processing algorithm including a neural net, comprising in any operative sequence the steps of:
   a) establishing a keep out zone;
   b) establishing a non-keep out zone;
   c) defining between said keep out and non-keep out zones an intermediate gray zone;
   d) selecting a representative known scenario training set selected from known seat empty and seat occupancy scenarios which include scenarios involving each of said zones;
   e) receiving and processing signals from said zones, which processing includes discard of information from the gray zone signals that is ambiguous with respect to classification of occupancy state; and
   g) extracting from the training set sensor output data on such features as carry actual classification information.

7. Method as in claim 6 which includes the added steps of:
   a) training the neural network using known scenarios;
   b) testing the neural network performance against a independent test set comprising a different set of known scenarios; and
   c) repeating the conditioning and training steps until a selected classification accuracy has been achieved.

8. The method of claim 7, wherein said at least one sensor signal processing algorithm includes at least one sensor fusion algorithm.

9. Method as in claim 8 wherein a fusion algorithm executes the neural network.

10. The method of claim 6, wherein said at least one sensor signal processing algorithm includes at least one sensor fusion algorithm.

11. Method as in claim 10 wherein a fusion algorithm executes the neural network.

* * * * *